2,694,058

PRODUCTION OF POLYURONIC ACID DERIVATIVES

Leo Berger, Nutley, N. J., assignor to Hoffmann-La Roche Inc., Nutley, N. J., a corporation of New Jersey No Drawing. Application October 20, 1951, Serial No. 252,403

6 Claims. (Cl. 260—209.6)

This invention relates to a method for producing a fraction of methanol-hydrogen chloride degraded alginic acid, which when substantially fully sulfated yields a product which has a high blood anticoagulant activity combined with a low toxicity.

Partially degraded alginic acid, obtained by the methanol-hydrogen chloride degradation of alginic acid, is described by Hirst, et al., J. C. S. (1939) pages 1880–1885. I have found that when alginic acid is partially degraded with methanol-hydrogen chloride a solid product is obtained, only part of which is soluble in cold water. When the cold water-soluble portion is dialyzed against water, a fraction is obtained, which, when substantially fully sulfated, yields a product having the above mentioned properties. By cold water is meant water at a temperature of about 20–30° C.

In general, the process for obtaining the novel fraction comprises partially degrading alginic acid, preferably in the form of a salt, e. g., the sodium salt, with methanol-hydrogen chloride, recovering the solid degradation product formed from the reaction medium, suspending the solid degradation product in cold water, filtering off the water-insoluble portion, and dialyzing the resulting solution against water.

The methanol-hydrogen chloride reaction degrades the alginic acid into smaller polymannuronic acid residues, simultaneously esterifies the carboxyl groups, and methylates the glycosidic hydroxyl group. Accordingly, the product obtained on partially degrading alginic acid is designated herein as polymannuronic acid methylglycoside methyl ester.

The specific temperature, concentration of hydrogen chloride in the methanol, and the length of time to be employed to partially degrade the alginic acid in any given case may easily be determined. They depend, on the one hand, on the starting material employed, and on the other hand, on the degradation desired, the latter being characterized by the obtention of a degradation product yielding a water-soluble portion having a reduced viscosity of between about 0.081 and about 0.110 which on dialysis yields a polymannuronic acid methylglycoside methyl ester fraction, having a reduced viscosity of between about 0.120 and about 0.124.

I have found that the desired degradation product is obtained when, for example, sodium alginate having a relative viscosity of about 30 compared to water is suspended in anhydrous methanol containing 5 per cent of dry hydrogen chloride (w./v.) and heated to reflux temperature under constant stirring for 96 hours. About 70 per cent of the resulting product is soluble in cold water, the remainder being a water-insoluble gum. The reduced viscosity of the water-soluble portion of the partially degraded product varies between about .097 and about 0.110. When sodium alginate of the same relative viscosity is refluxed with 10 per cent hydrogen chloride in anhydrous methanol for 24 hours, the water-soluble portion of the degradation product has a reduced viscosity of about 0.019, and when refluxed for about 114 hours, the reduced viscosity of the water-soluble degradation product is about 0.081. A sufficient excess of methanolic hydrogen chloride is used so that the removal of some of the hydrogen chloride from the reaction solution by the conversion of the sodium salt of alginic acid to the free alginic acid does not appreciably affect the concentration of methanolic hydrogen chloride employed.

The dialysis of the water-soluble portion of the degradation product is carried out by placing the aqueous solution in cellophane casings. I employ for this purpose Visking cellophane sausage casings obtained from the Visking Company, Chicago, Illinois. The casings are placed in a tank of water and the solutions dialyzed against tap water until dialysis is complete. The course of the dialysis is followed by determining from time to time the weight of polygalacturonic acid methylglycoside methyl ester present in aliquots taken from the casing, and the dialysis interrupted when no further change in weight is exhibited by the samples on prolonging the dialysis. The dialysis is completed at this point. The weights are determined by freeze drying aliquot samples and weighing the dry residues. Thus, it was found that after dialyzing for about 14 days, the weight remained constant and the resulting dialyzed fraction of polymannuronic acid methylglycoside methyl ester had a reduced viscosity of between about 0.120 and about 0.124. Prolonging the dialysis did not alter substantially the weight or reduced viscosity of the resulting dialyzed fraction.

Accordingly, my process for producing the desired polymannuronic acid methylglycoside methyl ester fraction comprises, in general, partially degrading alginic acid, either the free acid or salt form, with methanol-hydrogen chloride to form a polymannuronic acid methylglycoside methyl ester product which is only partially soluble in cold water, suspending the product in cold water, removing insoluble portion from the aqueous suspension, and dialyzing the water-soluble portion of polymannuronic acid methylglycoside methyl ester product against water to constant weight.

As pointed out above, the dialyzed polymannuronic acid methylglycoside methyl ester is a valuable intermediate. Thus, it can be substantially fully sulfated, as, e. g., by chlorosulfonic acid in the presence of pyridine, to produce a sulfuric acid ester of polymannuronic acid methylglycoside methyl ester. For example, when the water-soluble dialyzed polymannuronic acid methylglycoside methyl ester is reacted with a chlorosulfonic acid-pyridine mixture at about 70–80° C. for about three hours and the pyridine salt of sulfated polymannuronic acid methylglycoside methyl ester thus formed is converted to the sodium salt, the resulting sodium salt contains about 15.6 per cent sulfur and has a reduced viscosity of between about 0.050 and about 0.070. Such a product has been found to be highly active as a blood anticoagulant while at the same time being substantially non-toxic. The sulfation procedure is carried out to accomplish a high degree of sulfation so that the hydroxyl groups are substantially all converted to corresponding sulfuric acid ester groups.

The dialyzed polymannuronic acid methylglycoside methyl ester also serves as a valuable intermediate for producing the new product, polymannuronic acid methylglycoside, which can be produced by freeing the former of its methyl ester groups, as, for example, by hydrolysis with sodium hydroxide. The polymannuronic acid methylglycoside can then be sulfated, so as to produce substantially fully sulfated polymannuronic acid methylglycoside. The sulfuric acid ester of the methylglycoside so obtained has a reduced viscosity of about 0.057. The sulfuric acid ester of polymannuronic acid methylglycoside may also be obtained by hydrolysis of the sulfuric acid ester of polymannuronic acid methylglycoside methyl ester. The hydrolysis can be readily affected by means, e. g., of sodium hydroxide. The hydrolysis may be complete or partial, according to the length of time and the temperature at which the hydrolyzing agent is allowed to act. It will be apparent, therefore, that products may be produced which carry free carboxyl groups as well as carbomethoxy groups.

While, in general, the sodium salt of the sulfuric acid ester of the polymannuronic acid methylglycoside methyl ester and of the polymannuronic acid methylglycoside are suitable for parenteral use, other salts may also be prepared, such as those of primary amines, e. g., ethylamine; secondary amines, e. g., diethylamine or diethanolamine; tertiary amines, e. g., pyridine, triethylamine, or 2-dimethylaminomethyl-dibenzofuran; aliphatic diamines, e. g., decamethylenediamine; and aromatic diamines, e. g., benzidine. Some of these are soluble in water, others are soluble in saline solution, and still others are insoluble and can be used for purposes of preparing suspensions for injection. Furthermore, salts of other alkali metals, e. g., potassium and lithium; of ammonia; and of the alkaline earth metals, such as barium, calcium or magnesium, may be employed. These salts embrace, in general, derivatives of salt-forming cations.

The figures given above and hereinafter for the reduced viscosity are based on viscosity measurements, made in the standard manner, of 1 to 2 per cent solutions of the products in 0.5 N sodium chloride solutions at 30.6±0.2° C. by means of the Ostwald-Cannon-Fenske viscosimeters (M. R. Cannon and M. R. Fenske, Ind. Eng. Chem., Anal. Ed., 10, 297 (1938)). A. S. T. M. No. 50 viscosity tubes were employed. The saline solutions are used to eliminate the electro-viscous effect of the sulfated polymannuronic acid methylglycoside methyl ester and of the sulfated polymannuronic acid methylglycoside. It is not necessary to employ saline solution for the viscosity measurements of the polymannuronic acid methylglycoside methyl ester and polymannuronic acid methylglycoside products, but it is convenient to do so to eliminate further standardization of the viscosity tubes. The No. 50 A. S. T. M. tubes were chosen to give a flow time of 400-600 seconds for the 1 to 2 per cent solutions at 30.6°±0.2° C. to reduce, as far as practical, the stopwatch error of 0.5 to 1.0 second in time recordings.

The reduced viscosity is calculated according to the following equations from the flow time measurements:

$$\frac{\text{Flow Time (Seconds) Solution}}{\text{Flow Time (Seconds) Solvent}} = \eta \text{ rel}$$

$$\eta \text{ rel} - 1.000 = \eta \text{ sp}$$

$$\eta \text{ sp}/c = [\eta]$$

wherein $\eta$rel stands for the relative viscosity, $\eta$sp for the specific viscosity, $c$ for concentration in grams per 100 cc. of solution and $[\eta]$ for reduced viscosity. The viscosity measurements are subject to an experimental error of ±0.003.

The following examples will serve to illustrate my invention.

Example 1

100 grams of sodium alginate having a relative viscosity of about 30 compared to water are suspended in 1 liter of anhydrous methanol containing 5 per cent of dry hydrogen chloride (w./v.) and heated to reflux temperature under constant stirring. The reaction mixture is refluxed for 96 hours and then cooled to room temperature. The insoluble portion is collected by centrifuging, washed acid-free with three 500 cc. portions of methanol, and then dried in vacuo at 56° C. The polymannuronic acid methylglycoside methyl ester product thus obtained is suspended in 3 liters of water (20-30° C.), stirred for 3 hours and then set aside for 24 hours at room temperature. The insoluble portion is filtered off and the clear solution is placed in a Visking cellophane sausage casing, the casing placed in a tank of water, and the solution dialyzed against tap water for 14 days, a moderate stream of water being kept flowing through the tank during the entire dialysis step. The dialyzed solution is then concentrated to one-tenth its volume and freeze-dried to give a polymannuronic acid methylglycoside methyl ester fraction. It was found to have a reduced viscosity of between about 0.120 and about 0.124, as compared with a reduced viscosity of between about .097 and about 0.110 for the water-soluble portion prior to dialysis.

Example 2

200 grams of sodium alginate having a relative viscosity of about 30 compared to water are suspended in 2 liters of 10 per cent dry hydrogen chloride in anhydrous methanol (w./v.) and stirred under reflux conditions for 24 hours. The reaction mixture is then cooled to room temperature, and the insoluble portion collected by centrifuging, and washed acid-free and salt-free with several washes of methanol. The polymannuronic acid methylglycoside methyl ester product thus obtained is suspended in 2,600 cc. of water at 25° C. and stirred for 2 hours and then set aside for about 16 hours at room temperature. The insoluble fraction is removed by centrifuging and the water solution is filtered clear through an asbestos pad. The clear aqueous solution is added with stirring to 9 liters of ethanol to precipitate the polymannuronic acid methylglycoside methyl ester. The precipitate is collected by centrifuging. There is obtained 24.1 grams of water-soluble polymannuronic acid methylglycoside methyl ester having a reduced viscosity of about 0.109. This is dissolved in sufficient water to make a 2 per cent solution (w./v.) and dialyzed against flowing tap water for 14 days in cellophane sausage casings until no further dialysis occurs, in the same manner as described in Example 1. The solution in the casings is recovered, concentrated to one-tenth its volume, and added to 10 volumes of ethanol. The dialyzed polymannuronic acid methylglycoside methyl ester that precipitated is recovered by centrifuging and washed once with ethanol and dried. There is thus obtained dialyzed polymannuronic acid methylglycoside methyl ester having a reduced viscosity of about 0.124.

In the above examples, instead of employing sodium alginate, the free alginic acid per se may be employed. However, the sodium alginate is commercially available and more readily handled.

The following examples illustrate the methods for preparing the novel sulfuric acid ester compounds. Example 3 illustrates the preparation of substantially fully sulfated polymannuronic acid methylglycoside methyl ester. Examples 4 and 5 disclose methods of preparing substantially fully sulfated polymannuronic acid methylglycoside. The reduced viscosity values given are those determined in the manner described hereinabove.

Example 3

A mixture of chlorosulfonic acid and pyridine is prepared at 0° C. to 5° C. by the careful addition of 21 cc. of chlorosulfonic acid to 130 cc. of pyridine. The mixture is then heated to 70-80° C., and under constant stirring 4.5 grams of the dialyzed polymannuronic acid methylglycoside methyl ester fraction, prepared as in Example 1, are added. The reaction mixture is stirred at 70-80° C. until the polymannuronic acid methylglycoside methyl ester goes into solution. This requires about 3 hours. The warm solution is then poured into 1.5 liters of methanol with stirring. A crude pyridine salt of sulfated polymannuronic acid methylglycoside methyl ester separates. It is collected by centrifuging and washed with methanol. The salt is purified by dissolving it in 50 cc. of water and the solution clarified by filtration. The pure pyridine salt is isolated by the addition of the filtrate to 500 cc. of methanol.

The purified pyridine salt is converted to the sodium salt by dissolving it in water cooled to 5° C. and adding sodium hydroxide while maintaining the temperature at about 5° C. until the pH of the solution is about 9.5. The alkaline solution is then added rapidly to 10 volumes of ethanol whereupon the sodium salt precipitates. The salt obtained is purified by dissolving it in water and reprecipitating with ethanol. The product is the sulfuric acid ester of polymannuronic acid methylglycoside methyl ester in the form of a sodium salt. It contains about 15.6 per cent sulfur and has a reduced viscosity of between about 0.050 and about 0.070.

The pyridine salt may also be used for the preparation of other salts of the sulfated polymannuronic acid methylglycoside methyl ester, as, e. g., potassium or lithium salts, by simply using the appropriate base and following the procedure set forth in this example for the preparation of the sodium salt.

The sodium salt is particularly useful for the preparation of salts of sulfated polymannuronic acid methylglycoside methyl ester that are slightly soluble in water or very insoluble in water; e. g., the decamethylenediamine salt is prepared by the addition of a solution of decamethylenediamine acetate in aqueous methanol to an aqueous methanolic solution of the sodium salt of sulfated polymannuronic acid methylglycoside methyl ester, to yield the decamethylenediamine salt of sulfated polymannuronic acid methylglycoside methyl ester, which is very slightly soluble in water but completely soluble in physiological saline solution; or the 2-dimethylaminomethyl-dibenzofuran salt may be prepared by mixing an aqueous solution of the sodium salt of sulfated polymannuronic acid methylglycoside methyl ester and an aqueous solution of 2-dimethylaminomethyl-dibenzofuran hydrochloride. The salt separates instantly as a white precipitate that is not soluble in water or a 1 per cent saline solution.

Example 4

To a solution containing 11.0 grams of the dialyzed polymannuronic acid methylglycoside methyl ester fraction, prepared as in Example 1, in 200 cc. of water are added 25 cc. of 6 N sodium hydroxide, and the reaction mixture is left to stand for 1½ hours at room temperature with occasional stirring. The pH of the mixture is then adjusted to 1.0 with excess 6 N hydrochloric acid and diluted with 4 volumes of water. After standing at room temperature for one hour, the solution is poured into one volume of methanol and the milky precipitate collected by centrifuging. For purification, the precipitate is dissolved in 2,400 cc. of water and filtered through a diatomaceous earth filter matte, e. g., Celite, and added to one volume of ethyl alcohol (made slightly acidic with a drop of concentrated hydrochloric acid) with stirring. The white precipitate is collected by centrifuging and dried in vacuo. The product is polymannuronic acid methylglycoside, obtained as a fine, white, dry solid. For the further treatment of this material, a solution of 50 cc. of chlorosulfonic acid and 260 cc. of dry pyridine is prepared at 0° C. and warmed to 75° C. Then 6.0 grams of the polymannuronic acid methylglycoside are added to the well stirred solution. The reaction mixture is maintained at 70–75° C. for 3 hours and then added to 1.5 liters of methanol while still warm. The pyridine salt of sulfated polymannuronic acid methylglycoside that separates is collected by centrifuging, washed twice with methanol and once with acetone in the centrifuge cups, and finally dried in vacuo. There is thus obtained a crude pyridine salt of the sulfated polymannuronic acid methylglycoside, which is then purified by dissolving it in water, clarifying by filtration, and isolating the pure pyridine salt by the addition of the filtrate to methanol, following the procedure of Example 3. The purified pyridine salt is converted to the sodium salt with sodium hydroxide, in accordance with the procedure of Example 3. The sodium salt of the sulfated polymannuronic acid methylglycoside is obtained as a powder and has a reduced viscosity of about 0.057. Other salts of the sulfated polymannuronic acid methylglycoside may be prepared in a manner similar to that disclosed in Example 3.

Example 5

6 grams of the sodium salt of sulfated polymannuronic acid methylglycoside methyl ester, obtained as in Example 3, are dissolved in 150 cc. of water and 15 cc. of 6 N sodium hydroxide solution are added at room temperature. The solution is then left standing at room temperature for 3 hours, after which it is added to 1.5 liters of methanol with stirring. The salt that separates is collected by centrifugation. It is the sodium salt of sulfated polymannuronic acid methylglycoside.

I claim:

1. A process of producing a polymannuronic acid methylglycoside methyl ester fraction which comprises partially degrading a member of the class consisting of alginic acid and the salts thereof with methanol-hydrogen chloride to form a polymannuronic acid methylglycoside methyl ester product which is only partially soluble in water at about 20–30° C., suspending the product in water at the aforesaid temperature, removing the insoluble portion from the aqueous suspension, dialyzing the resulting solution to constant weight of the polymannuronic acid methylglycoside methyl ester product present therein, and substantially fully sulfating the dialyzed polymannuronic acid methylglycoside methyl ester.

2. A process of producing a polymannuronic acid methylglycoside methyl ester fraction which comprises partially degrading sodium alginate with methanol-hydrogen chloride to form a polymannuronic acid methylglycoside methyl ester product which is only partially soluble in water at about 20°–30° C., suspending the product in water at the aforesaid temperature, removing the insoluble portion from the aqueous suspension, dialyzing the resulting solution to constant weight of the polymannuronic acid methylglycoside methyl ester product present therein, and substantially fully sulfating the dialyzed polymannuronic acid methylglycoside methyl ester.

3. A process according to claim 2 wherein the polymannuronic acid methylglycoside methyl ester fraction before dialysis has a reduced viscosity of between about 0.081 and about 0.110.

4. A process in accordance with claim 2 wherein the sulfated polymannuronic acid methylglycoside methyl ester is hydrolyzed to remove methyl ester groups.

5. A process in accordance with claim 3 wherein the polymannuronic acid methylglycoside methyl ester fraction after dialysis has a reduced viscosity of between about 0.120 and about 0.124.

6. A process which comprises partially degrading sodium alginate with methanol-hydrogen chloride to form a polymannuronic acid methylglycoside methyl ester product which is only partially soluble in water at about 20–30° C., suspending the product in water at the aforesaid temperature, removing the insoluble portion from the aqueous suspension, dialyzing the resulting solution to constant weight of the polymannuronic acid methylglycoside methyl ester product present therein, hydrolyzing the dialyzed product to obtain polymannuronic acid methylglycoside, and substantially fully sulfating the polymannuronic acid methylglycoside.

References Cited in the file of this patent

UNITED STATES PATENTS

| Number | Name | Date |
|---|---|---|
| 2,508,433 | Snyder | May 23, 1950 |
| 2,599,564 | Lee et al. | June 10, 1952 |
| 2,638,469 | Alburn | May 12, 1953 |

OTHER REFERENCES

Hirst et al., Jour. Chem. Soc. (1939), pp. 1880–1885.